United States Patent
Le Chevalier et al.

(10) Patent No.: US 8,584,259 B2
(45) Date of Patent: Nov. 12, 2013

(54) DIGITAL CONTENT DISTRIBUTION AND PROTECTION

(75) Inventors: Vincent Le Chevalier, San Jose, CA (US); Charles F. Geiger, San Jose, CA (US); Rahul Ravindra Mutalik Desai, San Jose, CA (US); Ashit Joshi, San Jose, CA (US); Dax Eckenberg, Los Gatos, CA (US); Joshua Richardson, Cupertino, CA (US); Brent Tworetzky, Palo Alto, CA (US)

(73) Assignee: Chegg, Inc., Santa Clara, CA (US)

( * ) Notice: Subject to any disclaimer, the term of this patent is extended or adjusted under 35 U.S.C. 154(b) by 48 days.

(21) Appl. No.: 13/339,980

(22) Filed: Dec. 29, 2011

(65) Prior Publication Data

US 2013/0174272 A1 Jul. 4, 2013

(51) Int. Cl.
*G06F 7/04* (2006.01)
*G06F 17/30* (2006.01)
*H04N 7/16* (2011.01)

(52) U.S. Cl.
USPC .......................................................... 726/28

(58) Field of Classification Search
USPC .......................................................... 726/28
See application file for complete search history.

(56) References Cited

U.S. PATENT DOCUMENTS

| | | | | |
|---|---|---|---|---|
| 2006/0153380 | A1* | 7/2006 | Gertner | 380/221 |
| 2008/0215897 | A1* | 9/2008 | Doyle et al. | 713/193 |
| 2010/0017615 | A1* | 1/2010 | Boesgaard Sorensen | 713/176 |
| 2010/0185868 | A1* | 7/2010 | Grecia | 713/176 |
| 2011/0099382 | A1* | 4/2011 | Grecia | 713/176 |

\* cited by examiner

*Primary Examiner* — Kambiz Zand
*Assistant Examiner* — Stephen Sanders
(74) *Attorney, Agent, or Firm* — Fenwick & West LLP (57) ABSTRACT

Embodiments provide a system for content distribution and protection. The system first receives an order from a user for a protected document. In response to a successful user authentication, the system generates an access code for the user to access the protected document. In response to a received user reading request, the system validates the access code for a reading session. The system then transfers a set of URLs for accessing a set of pages and associated metadata in the protected document to the user. The set of URLs are valid for a period of time. Responsive to a request for reading a next set of pages, the system again validates the access code for the session and transfers another set of URLs for accessing the next set of pages. The system also logs user activities related to the protected document.

24 Claims, 5 Drawing Sheets

DIGITAL CONTENT DISTRIBUTION AND PROTECTION

CROSS-REFERENCE TO RELATED APPLICATION

This application is related to U.S. patent application Ser. No. 13/253,011, which is incorporated by reference in its entirety.

BACKGROUND

1. Field of the Invention

This invention relates to a publishing platform for aggregating, managing, and delivering electronic content to connected consumer electronic devices.

2. Description of the Related Art

The education publishing industry faces a number of significant challenges to effectively delivering media and services through an on-line delivery network. These challenges center around four discrete phases:
1. Ingestion: A lack of digital textbook standardization, a plethora of incompatible formats, and a lack of integration and interoperability between publishers makes it difficult to ingest and aggregate a large volume of educational content efficiently and reliably.
2. Publishing: Significant transformation of education content needs to be undertaken to ensure that the content is suited to publish across a variety of client devices that users may use to access the content.
3. Distribution: In an electronic distribution environment, particular attention needs to be given to issues of content protection and rights management, as well as service policies and quality of service, so that content providers are fairly compensated and users of the content perceive the value and reliability of the service.
4. Connected Services: In an educational platform, there exists the potential to deliver a rich user experience that extends beyond electronic access to textbooks. To implement such connected services would require complex business rules and content models that are unavailable in existing education digital publishing services.

Effectively enabling and managing each of the above four phases has not yet been accomplished by the education publishing industry. Accordingly, this has inhibited the growth of delivering media and services through an on-line delivery network.

SUMMARY

Embodiments of the invention provide a system for content distribution and protection. The system first receives an order from a user for a protected document. In response to a successful user authentication, the system generates an access code for the user to access the protected document. In response to a received user reading request, the system validates the access code for a reading session. The system then transfers a set of URLs for accessing a set of pages and associated metadata in the protected document to the user. The set of URLs are valid for a period of time. Responsive to a request for reading a next set of pages, the system again validates the access code for the session and transfers another set of URLs for accessing the next set of pages. The system also logs user activities related to the protected document.

In various embodiments, the protected document is in a markup language format. The document is further protected by encrypting markup language elements, which include fonts, body of texts, tables, images, graphs, formulas, page layout, and metadata. The system decrypts the encrypted markup language elements for user access in response to the validated access code.

In various embodiments, the set of pages includes at least one page, and up to a plurality of pages that are a proper subset of the protected document. The period of time that the set of URLs are valid is controlled by the reading session. Furthermore, the set of URLs transferred to the user is encrypted, and is decrypted by a user application before accessing the protected document. The user activities logged by the system comprise navigating the document and generating content, which include highlights, notes, annotations, answers, and comments. The user generated content associated with the protected document is further distributed by the system.

Embodiments of the invention also provide a content distribution and protection system, which first deconstructs the document into a plurality of pages. The system then applies a first protection on a first set of the pages, and a second protection on a second set of pages. The first set of pages and the second set of pages are different proper subsets of the document, and the first protection and the second protection are two different protection layers in a plurality of protection layers for access control.

In various embodiments, the system determines a security level for a user to access a page based on a user profile, and determines a protection level for the page based on the determined security level. The system further converts a page into a plurality of markup language elements and associated metadata, and applies different protections to different markup language elements and metadata.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The successful and rapid growing adoption of electronic books and web based publishing services have confirmed that consumers of a wide distribution of gender and age around world are ready to migrate from print to digital content. Book publishers and content providers have embraced this trend by elevating their business models and making their ever growing content library available under strict licensing terms which specify the rules for accessing, copying, sharing, printing and pricing their valuable content in fear of illegal piracy. In order to address the publishers' concerns over illegal download and sharing of their content, distribution platforms and service providers need to implement many software systems to satisfy the terms of licenses and to protect the digital content from unauthorized access. For example, a number of incompatible proprietary digital rights management (DRM) solutions have been deployed.

The current eBook commercial success is due in a large part to the adoption of ePub, the open eBook standard by the International Digital Publishing Platform (IDPF). The ePub format, with its embedded metadata and single file packaging approach, has proven to be a good solution for easy distribution and off-line reading. A DRM protected eBook in ePub format can be downloaded and decrypted only by an authenticated user device. However, for certain categories of books, such as textbooks, education, travel, art and cooking books, whose images, graphs, tables, maps, proprietary fonts, and multicolumns of text are assembled into complex sets of customized publications, converting into ePub format may be quite challenging. For example, textbook publishers demand upscaled protection in addition to dynamic pricing for purchases and rentals across any education distribution platforms (recent reports show that the average cost of textbooks at four-year public colleges was $1,137 for the 2010-2011 school year). It is, therefore, highly desirable to have a platform for distributing the copyrighted content in many more rich formats, while protecting the content at much more dynamic and flexible levels.

Embodiments of the invention provide such a content distribution and protection system. The system distributes books and documents in modern markup language format (e.g., HTML5) across multi-platform to desktop and mobile computing devices. In contrast to the ePub books or PDF documents, which need to be downloaded and extracted entirely before being available to proprietary eReader applications, the content in modern markup language format can be protected and downloaded to general eReader applications (e.g., a HTML5 compatible browser) on a page by page basis, hence lowering the risk of having the entire book or document cached by the eReader applications. The system takes the advantage of metadata, page layout information, and rich content embedded in the markup language pages to facilitate efficient distribution across multi-platform environments and enhanced protection at multiple levels and finer granularities.

Platform Overview

Figure 1:
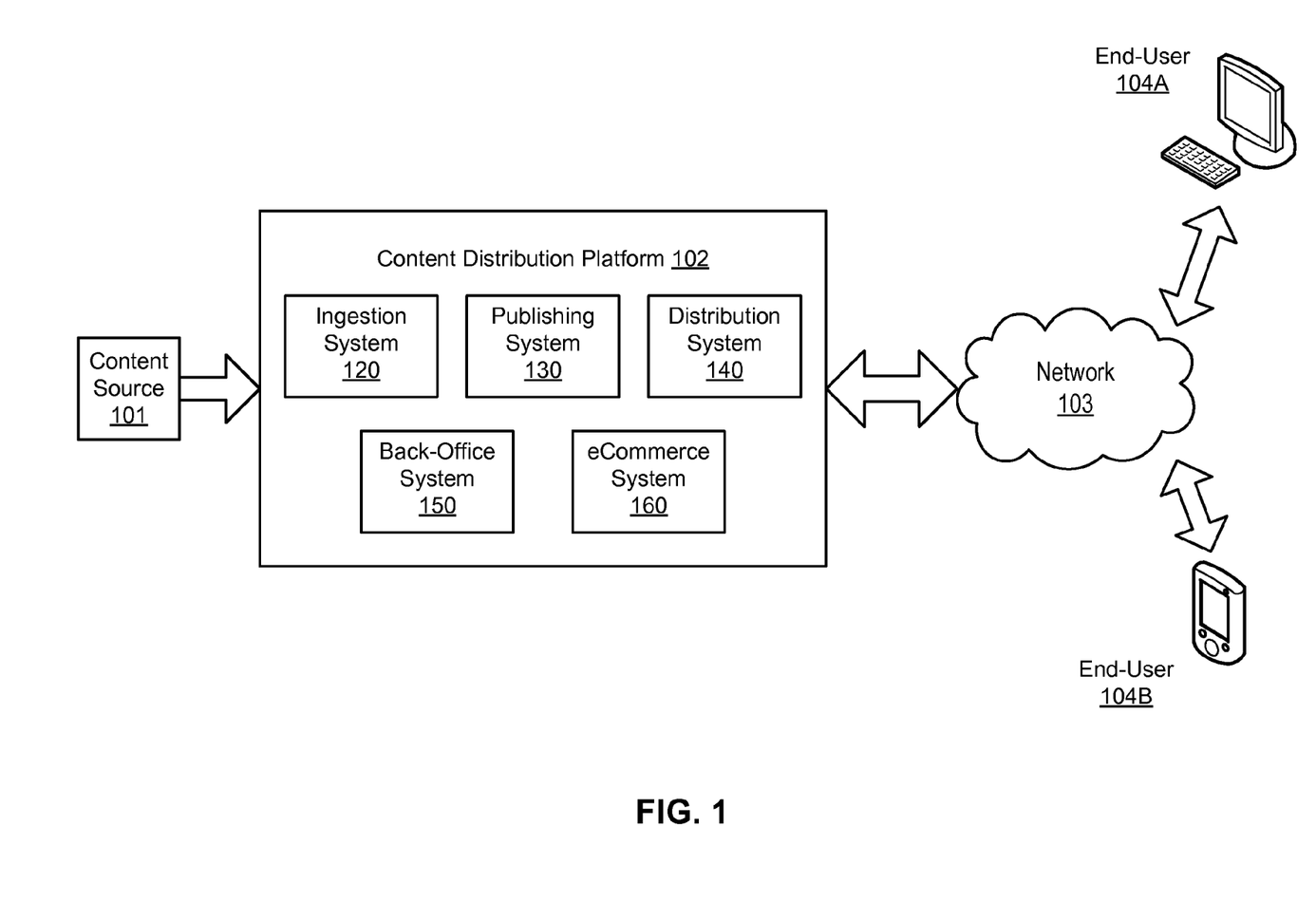
FIG. 1 is a high-level block diagram illustrating a digital content distribution platform, in accordance with an embodiment of the invention.

FIG. 1 illustrates a block diagram of a system environment for a digital content delivery and online education services. The system environment facilitates flexible distributions of digital books from publishers to end users. The content distribution platform 102 is described in more detail in U.S. patent application Ser. No. 13/253,011 titled "Electronic Content Management and Delivery Platform" filed on 4 Oct. 2011, the disclosure of which is incorporated herein by reference in its entirety.

As shown in FIG. 1, the digital reading environment comprises a content source 101, a content distribution platform 102, a network 103, and one or more clients 104. The content source 101 includes digital and printed content automatically gathered and aggregated from a large number of publishers, categories, and partners. Examples of content include textbooks, trade books, magazines, newspapers, user-generated content, web content, and advertising content.

The content distribution platform 102 aggregates, validates, transforms, packages, and monetizes the content collected by the content source 101 into a number of business services, prior to distribution to the clients 104 over the network 103. The platform comprises five systems: an ingestion system 120, a publishing system 130, a distribution system 140, a back-office system 150, and an eCommerce system 160.

The ingestion system 120 first gathers information on the type, file formats, and file manifest of the content. The ingestion system then checks files' integrity and conformity to standards, such as PDF, ePUB2, ePUB3, XML, HTML, and other formats. Content files that fail the integrity and conformity checks are flagged for further testing and repairing. Each content file that passes the checks is assigned a unique identifier and stored in a database for access by the publishing system 130.

The publishing system 130 converts ingested documents into markup language documents, for example, an HTML5 web page with enhanced metadata, which is well-suited to distribution across a wide variety of computing devices connected to the content distribution platform 102 via the network 103. Due to the original format of the source content and the complexity of the layout of the original document, the converted markup language documents are tested by the publishing system 130 to determine whether the conversion preserves the page fidelity compared to the original printed document. The page fidelity includes the original page structure, such as the pagination of the original printed document, the number of columns and arrangement of paragraphs, the placement and appearance of graphics, titles and captions, and the fonts used. Only converted documents that meet a minimum requirement of page fidelity are approved for distribution.

The distribution system 140 packages the content for delivery and uploads the content to content distribution networks. Then, the distribution system 140 makes the content available to end-users based on the content's digital rights management policies. More details of the publishing system 140 are described with reference to FIG. 2 below.

The back-office system 150 handles tasks dedicated to running business within the content distribution platform, such as accounting, human resource, and project management. The back-office system 150 also manages the interactions with customers, clients, and sales.

The eCommerce system 160 manages the online processes of marketing, selling, servicing and receiving payments for digital products and services. Hence the eCommerce system 160 is closely interfaced to the publishing system 130, distribution system 140, as well as the back-office system 150.

The network 103 facilitates content and service distribution and communications between various components of the system environment. Contents are packaged and distributed across the network 103 for client consumption. The overall quality of service received by the clients is also monitored and reported back to the content distribution platform 102 over the network 103. The network 103 is typically a content delivery network (CDN) built on the Internet, but may include any network, including but not limited to a LAN, a MAN, a WAN, a mobile wired or wireless network, a private network, or a virtual private network.

The clients 104 access the content from web browsers on computing devices connected to the network 103. The computing devices include a personal computer, such as a desktop, laptop, or tablet computer, a personal digital assistant, a mobile or smart phone, or a television "set-top box" using a client web application. The educational content are transformed by the content distribution platform 102 and delivered to the clients 104 across the network 103. As the clients enjoy the consistent reading experiences and high-quality services, the web browsers on the clients' devices regularly communicate with the content distribution platform 102 for updating reading content and connected services. In addition, user data on the clients' experience with the service and quality of the network connections are also collected and uploaded to the content distribution platform 102 through network 103.

In contrast to existing digital publishing services, such as AMAZON KINDLE®, the disclosed content distribution platform does not require users to purchase a specific client device or download a standalone application from the service provider to access the content. Rather, any HTML5 compatible browser on a user's computing device may receive, from the content distribution platform 102, structureless HTML5 page elements to construct pages of a document on the browser, along with a host of document specific metadata to enhance the user's reading experience with the document, such as thumbnail navigation and an interactive table of contents. The HTML5 pages of the document also supports a number of reading activities, such as creating highlights, taking notes, and accessing a dictionary Annotations, such as highlights, drawings, notes, comments, and other personalized data created by the user can be displayed as an overlay on the original content, stored and archived in the user account, synchronized across all registered devices of the user, and optionally shared among the user's friends, classmates, campus, or other groups, as part of an education social platform. It is noted that although embodiments of the invention are described herein with reference to HTML5, other markup languages with suitable characteristics may also be used in place of HTML5.

Distribution System

Figure 2:
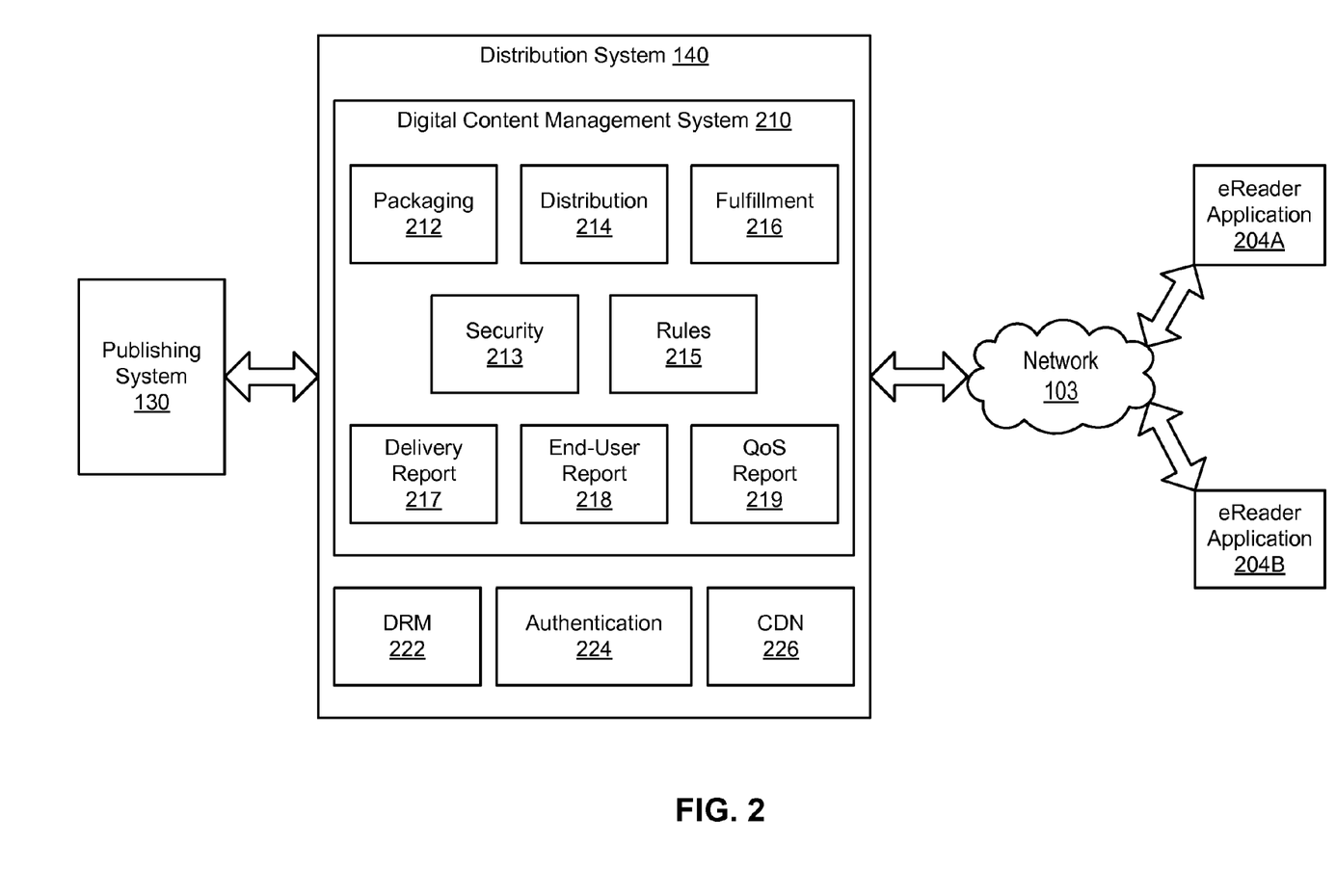
FIG. 2 is a block diagram illustrating a distribution system, in accordance with an embodiment of the invention.

FIG. 2 illustrates one embodiment of a block diagram of the distribution system 140. The distribution system 140 is a component of the content distribution platform 102 illustrated in FIG. 1. The distribution system 140 packages the content for delivery, uploads the content to content distribution networks, and makes the content available across the network 103 to eReader applications 204 of the end-users based on the content's digital rights and management policies. Functionally, the distribution system 140 includes a digital content management system (DCMS) 210, a DRM module 222, an authentication server 224, and a content distribution network (CDN) 226.

DCMS 210:

The digital content management system 210 includes eight modules: packaging 212, distribution 214, fulfillment 216, security 213, rules 215, and three reporting modules: a delivery report 217, an end-user report 218, and a quality of service (QoS) report 219. The packaging module 212 packages together all files associated with a particular portion of a document, referred to as an "asset," published by the publishing system 130. Specifically, the files include content and metadata, for example, pictures of different resolution, character fonts, thumbnails, and a bookmarked table of contents, which are combined together into a data package that represents the asset.

The distribution module 214 centralizes the content of assets available for distribution before uploading it to the CDN 226, based on the outcome of the packaging module 212. The contents ordered by the end-users are also indexed and transferred to the users by the distribution module 214. Furthermore, user-generated content created through end-users' applications 204 is also uploaded by the distribution module 214 so that it can be stored, synchronized and redistributed to the CDN network for later consumption.

The fulfillment module 216 tracks the status of an order once a purchase order is received by the content distribution platform 102. The content associated with the order is identified, associated to the account that created the order, and marked for distribution. The fulfillment module 216 reports the status of the order to the eCommerce system 160 of the content distribution platform 102. As an example, a typical order is processed through a number of logical steps, including order configuration, order booking, acknowledgement/ confirmation, invoicing/billing, order changes, order processing, delivery, settlement, and returns/refunds.

The security 213 protects content by additional security layers defined at the service level, for example, the secure socket layer (SSL) certificate to ensure secure transactions between the distribution system 140 and the user applications 204. These additional security layers are typically the result of complex eCommerce business rules that specify how content needs to be protected. The rules 215 defines the business rules governing content protection that are specific to content owners, to the particular service being deployed, and/or to the specific asset. The level of content protection can be adjusted based on the content that is being distributed across particular services, and may differ between pages of content of a document or even between parts of a page of content. As an example, a publisher may limit the number of pages that can be printed by a particular user, and not limit the pages that can be printed by other users. As another example, certain pages of a document may be freely available for a limited time, while other pages of the document are only available to those who have purchased access. As another example, a publisher may allow printing of the text of a chapter, but not a particular image on a page of the chapter.

The three reporting modules (the delivery report 217, the end-user report 218, and the QoS report 219) report on issues that may affect the user's experience or digital content management. The delivery report 217 contains reports on content delivery issues monitored across the distribution module 214 and CDN 226. For example, incorrect URLs or obsolete time sensitive URLs are identified and recorded. The end-user report 218 includes reports aggregated on a frequent periodic basis from end-user web applications that monitors users' reading activities as well as user generated content, such as annotations, highlights, etc. Examples of logged user activities include the number of printed document pages and volume of copy/paste activities, as defined by business rules specified by individual publishers or platform-wide business rules. The QoS report 219 collects data reported by the eReader applications and their users to identify service level issues that are possibly affecting the overall quality of the user experience. Examples of QoS issues include incorrectly formatted content, CDN latencies or content synchronization issues.

The DRM 222 encrypts content with a DRM layer, typically using Advanced Encryption Standard (AES) Kerberos 128. Such an encryption mechanism protects the content from being easily copied by end-users once it is downloaded to their client device.

The authentication server 224 authenticates user orders and access to the asset. Further, the authentication server 224 authorizes the asset for distribution according to the associated protection mechanisms that may vary according to publishers, service offerings, and/or individual assets.

The CDN 226 uploads content to the CDN origin server. Once the content is uploaded to the CDN origin server, the content is pushed automatically to CDN edge servers geographically distributed around the country where each page and elements of a document are referenced with its own short time-based URL shared with an end-user eReader application 204. Hence, the content is effectively protected from unauthorized distribution. In one implementation, third-party CDN server infrastructure, such as AKAMAI®, may be used to host the content closer to end-users, facilitating scalability and performance requirements of the server infrastructure while improving user experience in access time to the content.

Content Distribution and Protection

Figure 3:
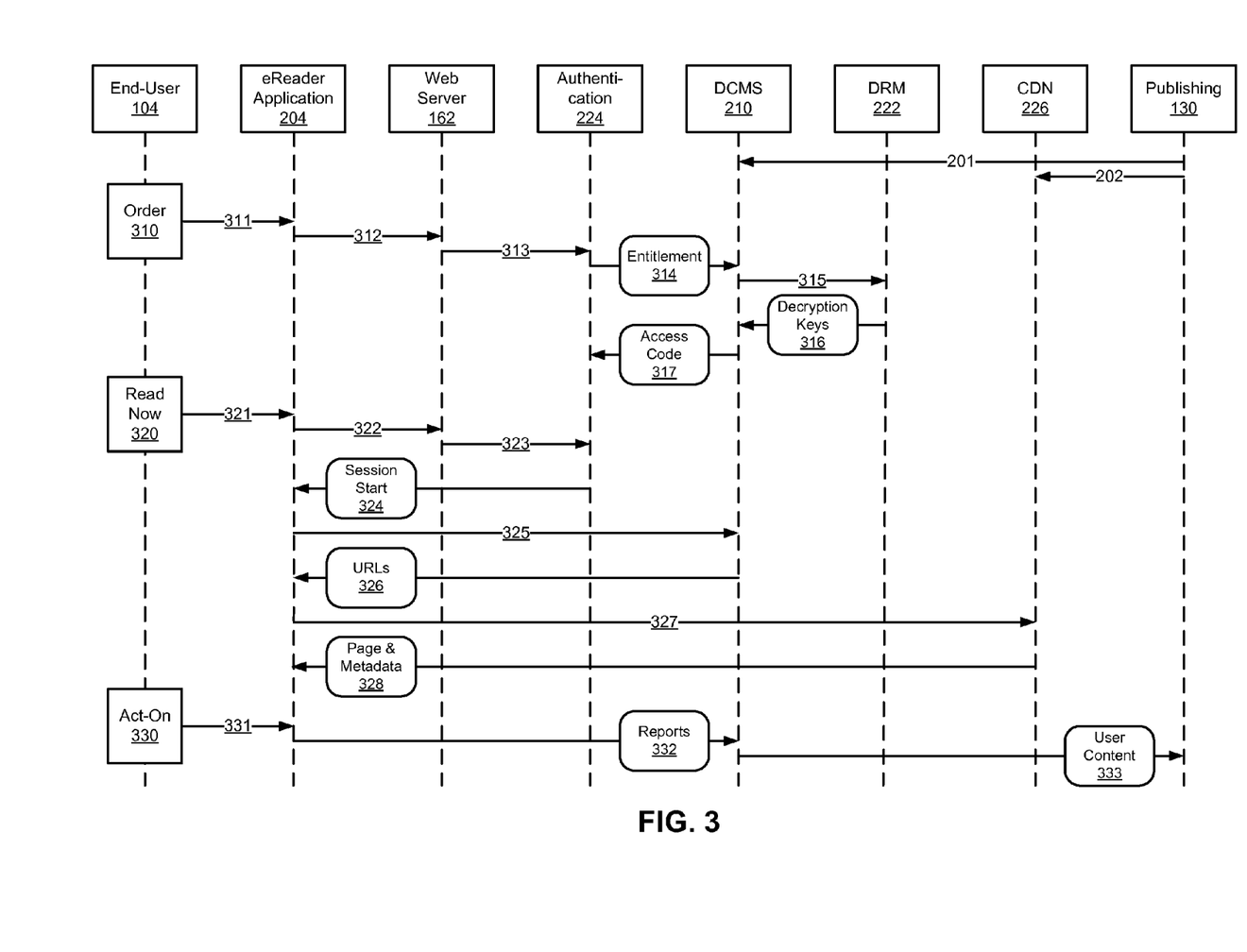
FIG. 3 is a block diagram illustrating one embodiment of event traces in a content distribution and protection system, in accordance with an embodiment of the invention.

FIG. 3 illustrates one embodiment of event traces in a content distribution and protection process for validating end-user credentials and fulfilling content requests received from end-users. The content distribution and protection process involves the following entities: an end-user 104, an eReader application 204, a web server 162, an authentication server 224, a digital content management system (DCMS) 210, a DRM server 222, a CDN 226, and a publishing server 130.

The end-user 104 of the content distribution platform 102 interacts with the eReader application 204 to order and act on digital contents. The eReader application 204 is a markup language browser with embedded eReader application downloaded from the DCMS 210 for rendering and displaying the content (e.g. a HTML5 web browser with DCMS compatible plugins), so that the end-user 104 can read and annotate the content. The web server 162 is the front end system that receives and processes orders from the end-user 104. The web server 162 provides the website for digital content service to which the eReader application 204 is connected. The DRM 222, the authentication server 224, and the CDN 226 are all parts of the distribution system 140: they can be modules within one computer system or, in this case, standalone servers. The DCMS 210 is the center piece for the content distribution and protection: it receives the index information of published content from the publishing system 130, manages content protections, decides on how the content can be served, and reports content delivery and user activities.

The steps shown in FIG. 3 are intentionally high level and not intended to represent individual computer programming instructions or operations, but rather the system inputs, behaviors, and output of the system components described above, as well as high level inter-process or inter-module communication. Those of skill in the art will appreciate the steps shown can be implemented in practice as multiple individual operations. Further, the content distribution and protection operates at least in part asynchronously in an event driven manner, and thus the steps shown in FIG. 3 are to be understood as occurring in most cases in response to received signals or events, as will be clear from the context of the description.

Before any operation starts by the end-user, the publishing system 130 uploads 201 catalogs, indexes, and related contents (e.g., Q&A, quiz, and dictionary) of published digital contents to the DCMS 210, so that they are ready for users to order. The digital contents as well as the content catalog and related content are also pushed 202 to origin and edge servers in the CDN 226 for distribution.

User Orders Content 310:

List of content including document metadata, such as description, rental or sell, price, and terms, is offered for a user to order within the eReader application 204 (e.g., a HTML5 browser). For example, the user clicks 311 on a textbook "Biology101", or a web link "www.serviceprovider.com/userabdc/biology101" pointing to the document asset. The user's order is received 312 and validated by the web server 162. Next, the order information is transferred 313 to the authentication server 224. The user credentials may include a "UserID", which identifies the user initiating the order, a "DocumentID", which identifies the document being ordered, and a "DocumentIDTerms", which identifies the licensing terms for the document. In the above example, "Biology101" is the "DocumentID" in the order available under licensing terms specified by the "DocumentIDTerms", such as rental or sale, time period, pricing, and geographical availability, among others. A validated user order with identifiers "UserID, DocumentID, DocumentTermsID" is referred to as "entitlement". The entitlement is then transferred 314 to the DCMS 210, which processes the order by generating a unique access code for the user to access the ordered document identified by the triple "UserID, DocumentID, DocumentTermsID". Subsequently, the DCMS 210 transfers 317 the access code to the authentication server 224 where the access code is parked until further activation command is received. Optionally, if the ordered document is protected by DRM, the DCMS 210 sends 315 a request to the DRM server 211. The DRM 222, in response, sends back 316 public and private keys necessary to unlock the document. The decryption keys and their location are obfuscated into the access code 317 returned to the authentication server 214. Optionally, the access code 317 may be returned to the end-user 104 or maintained at the authentication server 214 to enable subsequent access by the end-user 104.

User reads now 320: The user selects an option to begin reading within the eReader application 204, for example, by clicking "Read Now" and the request received 322 by the web server 162, which in turn forwards 323 the command to the authentication server 224. The "Read Now" command is treated as a request for access to a set of pages in the ordered document, which may start at the last page the user was reading in a previous session, or the first page if the user reads the document for the first time. The set of pages can be a single page, or block of pages in a chapter depending on the cache size of the eReader application. The authentication server 224 then validates the command based on the access code associated with the user order, and authorizes the eReader application 204 to start 324 a new session, which can be uniquely identified by the identifier "UserID" and "DocumentID". Next, the eReader application 204 requests 325 to access the pages and receives 326 from the DCMS 210 a set of URLs pointing to the document pages stored in the CDN 226. The set of URLs include multiple links to the markup language elements and metadata needed to render the document pages on the eReader application 204. Furthermore, the page URLs controlled by the service provider, are only valid for a short time period and become invalid once the time expires. Following the time sensitive URLs, the eReader application 204 requests 327 and downloads 328 the page content and metadata from the CDN 226. The eReader application 204 may need to decrypt the page content and metadata, if applicable, before rendering the pages. In some embodiments, the URLs are encrypted by the DCMS 210 and/or can be accessed either through HTTP or secured HTTP for additional protections.

The eReader application 204 has a number of built-in navigation commands, such as "Previous Page" and "Next Page", which need to be transferred to the DCMS 210. Once processed, the DCMS 210 sends back a new set of time sensitive URLs corresponding to a respective navigation command. By following the new URLs, the eReader application 204 can download the page content and metadata, decrypts them if necessary, and renders the pages on the display. The page content may include image map, font map, and annotations, and metadata may include product metadata, asset Metadata, user metadata and enhanced Metadata. The user can also access document related Q&A and dictionary, which are validated by the DCMS 210 and integrated into the eReader application 204 as value-added services through real-time API. Such API mechanism can be safely integrated with both internal and external content service offering. As an example, the product Metadata has a reference to an external Q&A content. Hence, the user's request for the Q&A causes the browser 204's to send to the DCMS 210 a query, which is served by the real-time API integration with the external Q&A content provider. As another example, the page content and metadata may also include reference to a separate dictionary application. User's query on a specific definition, therefore, is served by the real-time API integration with the dictionary content provider though the DCMS 210.

User activities—reporting 330: While reading and navigating the ordered content, the user may generate 331 his or her own content, such as highlight, notes, annotations, comments, and answers to problems. These user generated content can be uploaded 333 to the publishing system 130 for integration with the services. For example, user highlights are identified by the locations in the rendered page and aggregated into the user metadata associated with the page. The eReader application 204 can log the user experience including navigation history and user generated content, and reports 332 the part or all the user behaviors to the DCMS 210 as defined by the content and service business requirements. For example, a user with ID "UserID123" read 10 pages of "Biology101" in his last reading session, during which he also printed 5 pages. User "UserID123" has a remaining 50 pages print credit for "Biology101". The DCMS 210 keeps track, for example in real-time or on a frequent periodic basis, of the active session properties, such as IP addresses and page download activities, which are necessary to enforce the content and service agreement. For example, "UserID124" already has 2 concurrent active sessions. A request for a third session results in closing one of the two active sessions, as defined by the service agreement. As another example, a request by "UserID125" is rejected from an IP address registered in a country outside the service provider's distribution rights and content policies. Similarly, a request from "UserID127" to access to all the pages in a document, which is inconsistent with the current on-line reading mode according to the service provider's distribution rights and content policies, may also be turned down.

Figure 4:
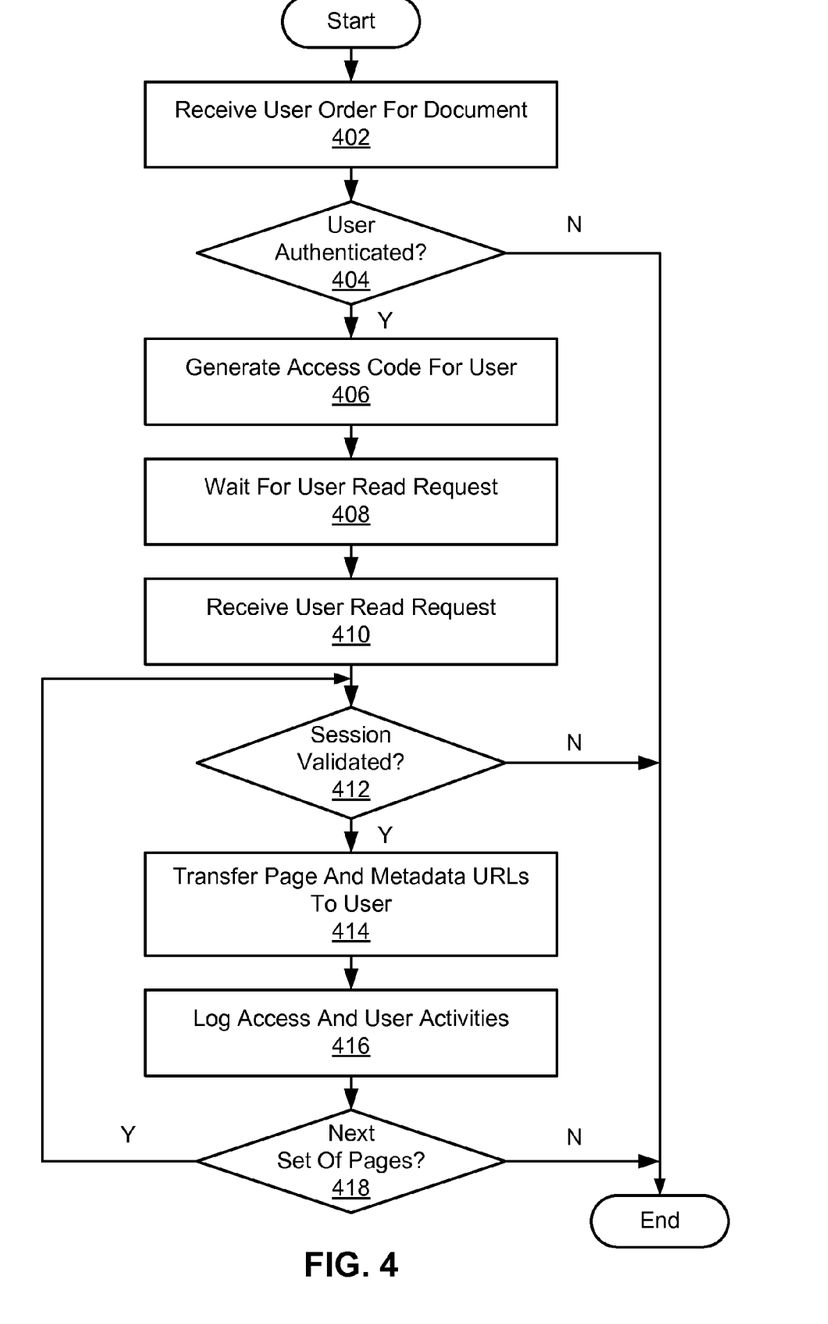
FIG. 4 is a flowchart illustrating the method of performing content distribution and protection, in accordance with an embodiment of the invention.

FIG. 4 is a flowchart illustrating a method for performing content distribution and protection, such as would be executed by the DCMS 210. First, a user order for a protected document is received 402. For example, the user order 310 is received by the eReader application 204 and forwarded to the web server 162, as described above with reference to FIG. 3. The user order is then authenticated 404, for example, by validating the triple "UserID, DocumentID, DocumentTermsID" at Authentication 210 as described above with reference to FIG. 3. If the authentication fails, the process is terminated. Otherwise, an access code is generated 406 for the user. For example, as shown in FIG. 3, validated user entitlement is forwarded to the DCMS 210, which creates an access code and transfers the access code to the authentication server 224 where the access code is stored. Optionally, if the ordered document is protected by DRM, decryption keys are also included in the access code.

After waiting for 408 and receiving 410 a user read request, a session for reading the document page is initiated given that the access code associated with the user and the document can be validated 412. If the session is not validated, the process is terminated. Otherwise, a set of URLs for accessing the content and metadata of a set of pages in the document is transferred 414 to the user. For example, after the authentication server 224 validated the reading session, the DCMS 210 transfer the URLs to the eReader application 204, which downloads the page content and metadata from the CDN 226 before rendering it on the display for the user, as described above with reference to FIG. 2. If the user decides 418 to navigate to the next set of pages, the reading session is again validated, and a set of new URLs to access the next set of page content and metadata is transferred to the user.

During the session, all the access and user activities such as delivery issues, quality of service, navigation history, printing and copying, as well as user generated contents are logged 416 under user consent or according to a service and privacy agreement. For example, these activity logs can be reported to the DCMS 210 for system monitoring purpose. User generated content can be forwarded to the publishing system 130 for further distribution.

Enhanced Content Protection

By combining limited downloads to the time sensitive URLs, the above described method provides a system level content protection for the digital publishing platform and Services. Specifically, since only a set of pages of the protected document is downloaded for reading at a time, acquiring unauthorized copies and sharing illegally the protected document in its entirety become naturally much more challenging than before.

To further enhance the protection, selected DRM layers can be applied to different pages or different elements of a page in the document. This DRM scheme differs from traditional document protections where the document file is encrypted as a whole. The integration of DRM at page level or sub-page level offers significant enhancement to the document security in terms of granularity and flexibility. The DRM layers can be updated as frequently as needed targeting particular pages on a much finer granularity compared to document or file level encryption.

Since each page of the document in the digital publishing platform is converted into markup language elements and associated metadata, additional level of document security can be introduce on various markup language elements. For example, a markup language page may include several different types of data, such as embedded images, layout information, font maps needed to render the page properly, and user generated contents that have been added to the page, as well as the metadata associated with the page (e.g., product metadata, asset metadata, user metadata and enhanced metadata). For the service and content providers, this data segmentation offers novel options to protect the content: the various data types can be effectively protected and secured either separately or collectively, in more dynamic and more targeted ways.

For example, a custom font may be critical to properly render particular pages of a document to be protected. Moreover, in a complex document, such as a Textbook, a large number of custom fonts are often used, and thus needed to preserve the document page fidelity. It is highly desired to introduce various mechanisms to protect the fonts separately from the rest of the page content. For instance, it is possible to remove a subset of the characters in a font map, such as the letter "A", so that an unauthorized rendering of the document to misses critical content information. In another example, different encryption schemes can be applied to different font sets.

Similarly, images, tables, and other graphic objects embedded in a document page can be individually protected by methods with various complexity levels. For example, a simple watermark can be overlaid on an image, or a proprietary signature can be hidden in a picture. Although the page containing watermark or a signature is not affected at rendering, the page becomes easily identifiable and traceable in the event of illegal sharing.

Furthermore, as a page is downloadable by the user only during the period when the time sensitive URLs are valid, document protections can be tailored to fit individual user profiles. For example, the service provider may decide to increase the access restriction for a document based on the user profile of the requesting user. The service provider can also protect a page based on its relative importance, or page location in the document. For example, a page containing a financial report may have increased layers of protection compared to a page of a simple introduction to the subject. Similarly, a page with an interactive Quiz may be more secured than a page without.

As more users join the content distributing platform, and more users generate contents, it becomes increasingly more important to selectively protect user profiles and user generated content in a flexible and dynamic fashion, such as the applied protection to the individual elements of a document page rather than at the document level.

Figure 5:
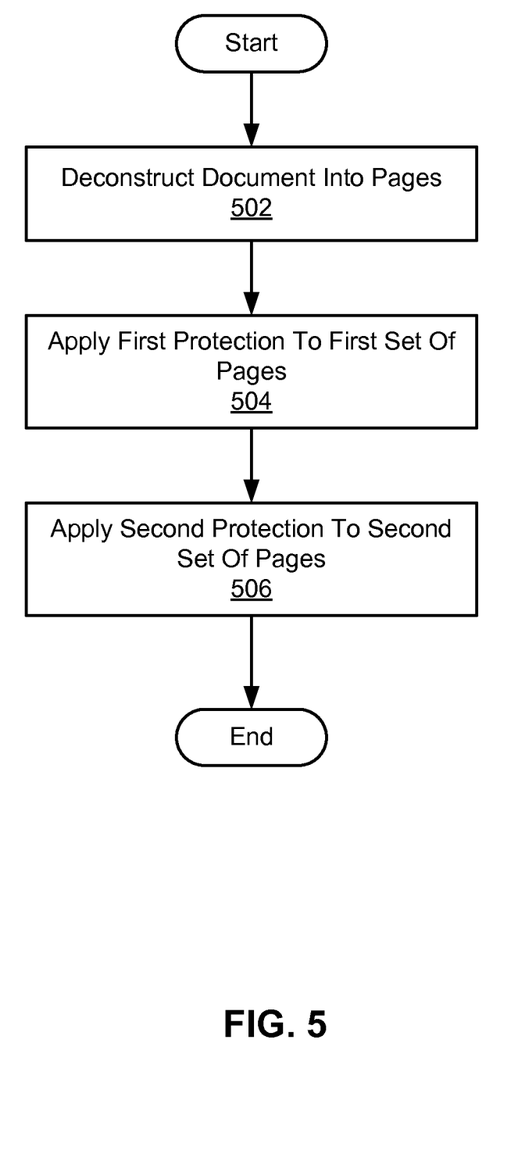
FIG. 5 is a flowchart illustrating the method of performing content protection at a page level, in accordance with an embodiment of the invention.

FIG. 5 illustrates a flowchart illustrating a method for performing document protection at a page level, such as would be executed by the DCMS 210. First, the document is deconstructed 502 into a plurality of pages. For example, the publishing system 130 ingests a document and converts each page into markup language elements, as described above with reference to FIG. 3. Next, a first protection is applied 504 to a first set of pages in the document, and a second protection, which is different from the first protection, is applied 506 to a second set of pages, which is different from the first set of the pages. For example, a page may be protected based on its relative importance, or location in the document as described above. In a similar manner, an addition protection or additional protections may be applied to a third set of pages which is at least partly different from the first and second set of pages, and so on. As a result, there is no limit on the ability to fully customize the protection applied to each page or sub-page element of a document.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method of content distribution and protection, the method comprising:
   receiving an order from a user for a protected document;
   in response to a successful user authentication, generating an access code associated with the order;
   in response to a received user reading request, validating the access code associated with the order and authorizing a reading session for the user;
   transferring a set of URLs for accessing a set of pages and associated metadata in the protected document to the user, wherein the set of URLs are valid for a period of time during the reading session for the user to access the set of pages;

responsive to a request for reading a next set of pages, validating the access code for the reading session and transferring another set of URLs to the user, wherein the set of URLs are valid for a period of time during the reading session for the user to access the next set of pages; and logging user activities related to the protected document.

2. The method of claim 1, wherein the protected document is in a markup language format.

3. The method of claim 2, wherein the document is further protected by encrypting markup language elements, which include fonts, body of texts, tables, images, graphs, formulas, page layout, and metadata.

4. The method of claim 3, further comprising decrypting the encrypted markup language elements for user access in response to the validated access code.

5. The method of claim 1, wherein the set of pages include at least one page, and up to a plurality of pages that are a proper subset of the protected document.

6. The method of claim 1, wherein the valid period of time is controlled by the reading session.

7. The method of claim 1, wherein the set of URLs transferred to the user is encrypted, and wherein the set of URLs is decrypted by a user application before accessing the protected document.

8. The method of claim 1, wherein the user activities comprise navigating the document and generating content, which include highlights, notes, annotations, answers, and comments.

9. The method of claim 8, further comprising distributing the user generated content associated with the protected document.

10. A method of content distribution and protection, the method comprising:
  deconstructing a document into a plurality of pages;
  applying a first protection on a first set of components;
  applying a second protection on a second set of page components,
  wherein the first set of page components and the second set of page components are different proper subsets of the document, and wherein the first protection and the second protection are two different protection layers in a plurality of protection layers for access control; and
  responsive to an authenticated request to access one or more pages from a user, generating a set of URLs valid for a period of time during a reading session for the user to access the pages based on protection layers associated with page components of the requested pages.

11. The method of claim 10, further comprising:
  determining a security level for a user to access a page based on a user profile; and
  determining a protection level for the page based on the determined security level.

12. The method of claim 10, further comprising:
  converting a page into a plurality of markup language elements and associated metadata; and
  applying different protections to different markup language elements and metadata.

13. A non-transitory computer-readable storage medium storing executable computer program instructions for content distribution and protection, the computer program instructions comprising instructions for:
  receiving an order from a user for a protected document;
  in response to a successful user authentication, generating an access code associated with the order;
  in response to a received user reading request, validating the access code associated with the order and authorizing a reading session for the user;
  transferring a set of URLs for accessing a set of pages and associated metadata in the protected document to the user, wherein the set of URLs are valid for a period of time during the reading session for the user to access the set of pages;
  responsive to a request for reading a next set of pages, validating the access code for the reading session and transferring another set of URLs to the user, wherein the set of URLs are valid for a period of time during the reading session for the user to access the next set of pages; and
  logging user activities related to the protected document.

14. The non-transitory computer-readable medium of claim 13, wherein the protected document is in a markup language format.

15. The non-transitory computer-readable medium of claim 14, wherein the document is further protected by encrypting markup language elements, which include fonts, body of texts, tables, images, graphs, formulas, page layout, and metadata.

16. The non-transitory computer-readable medium of claim 15, further comprising instructions for decrypting the encrypted markup language elements for user access in response to the validated access code.

17. The non-transitory computer-readable medium of claim 13, wherein the set of pages include at least one page, and up to a plurality of pages that are a proper subset of the protected document.

18. The non-transitory computer-readable medium of claim 13, wherein the valid period of time is controlled by the reading session.

19. The non-transitory computer-readable medium of claim 13, wherein the set of URLs transferred to the user is encrypted, and wherein the set of URLs is decrypted by a user application before accessing the protected document.

20. The non-transitory computer-readable medium of claim 13, wherein the user activities comprise navigating the document and generating content, which include highlights, notes, annotations, answers, and comments.

21. The non-transitory computer-readable medium of claim 20, further comprising instructions for distributing the user generated content associated with the protected document.

22. A non-transitory computer-readable storage medium storing executable computer program instructions for content distribution and protection, the computer program instructions comprising instructions for:
  deconstructing a document into a plurality of pages;
  applying a first protection on a first set of page components;
  applying a second protection on a second set of page components,
  wherein the first set of page components and the second set of page components are different proper subsets of the document, and wherein the first protection and the second protection are two different protection layers in a plurality of protection layers for access control; and
  responsive to an authenticated request to access one or more pages from a user, generating a set of URLs valid for a period of time during a reading session for the user to access the pages based on protection layers associated with page components of the requested pages.

23. The non-transitory computer-readable medium of claim 22, further comprising instructions for:

determining a security level for a user to access a page based on a user profile; and determining a protection level for the page based on the determined security level.

24. The non-transitory computer-readable medium of claim 22, further comprising instructions for:

converting a page into a plurality of markup language elements and associated metadata; and applying different protections to different markup language elements and metadata.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,584,259 B2 | |
| APPLICATION NO. | : 13/339980 | |
| DATED | : November 12, 2013 | |
| INVENTOR(S) | : Vincent Le Chevalier et al. | |

It is certified that error appears in the above-identified patent and that said Letters Patent is hereby corrected as shown below:

In the Claims

Column 13, line 36, after "applying a first protection on a first set of," insert -- page --.

Signed and Sealed this
Twenty-first Day of April, 2015

Michelle K. Lee
*Director of the United States Patent and Trademark Office*